Jan. 11, 1949.  G. R. ABELL, JR  2,458,759
GAUGE FOR MEASURING SUBATMOSPHERIC PRESSURES
Filed Nov. 3, 1944
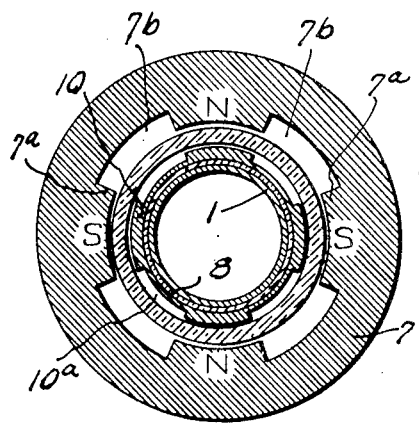
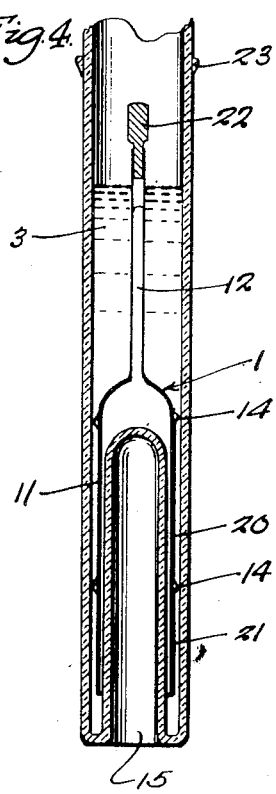
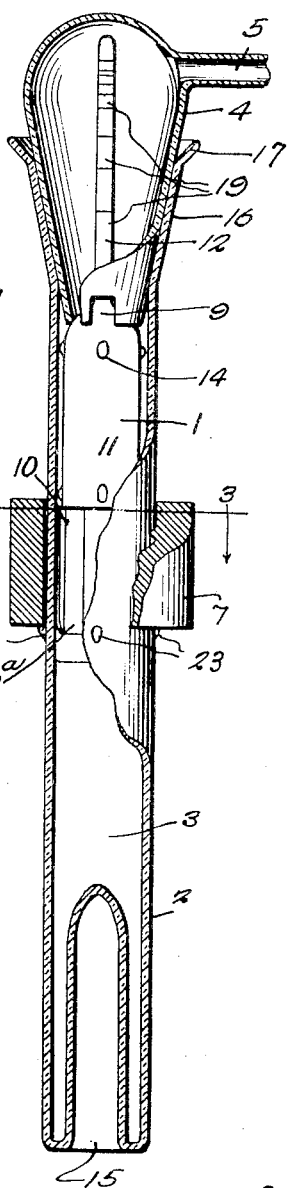
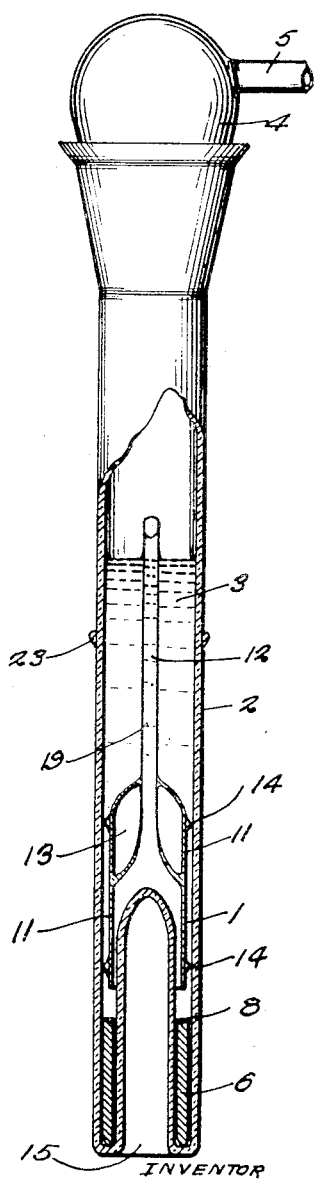
INVENTOR
GURDON R. ABELL, JR.
BY Clarence A. O'Brien
and Harvey B. Jacobson
ATTORNEYS Patented Jan. 11, 1949

2,458,759

UNITED STATES PATENT OFFICE 2,458,759

GAUGE FOR MEASURING SUBATMOSPHERIC PRESSURES

Gurdon R. Abell, Jr., Poughkeepsie, N. Y.

Application November 3, 1944, Serial No. 561,757

13 Claims. (Cl. 73—400)

This invention relates to so-called vacuum gauges for very low pressures and it has for its general object to provide a simple and effective pressure gauge of the above named type which permits high precision, easy and simple handling and accurate reading and which, moreover, consists of parts in members of the simplest possible shape and configuration, completely excluding the use of a plurality of vessels, the use of connection between such vessels, and the use of flexible or moving parts forming part of the outer wall which have to be sealed and shortly all seals and interruptions of a smooth and simple outer surface.

It is well known that the measuring of very low gas pressures, originally only performed for experimental purposes is now an operation used industrially so that the instruments designed for this purpose had to be redesigned for this type of use.

As a rule, measuring gauges or instruments for low pressures are operated either by the pressure differential between the unknown pressure and that of a Torricellian vacuum or between the unknown pressure and that of a multiple thereof, this latter being obtained by a reduction of volume according to Boyle's law.

The instruments of the first-named type present a simple outline, require only one vessel and have no sealing problems. The moving members, if any, may all be enclosed within a single sealed vessel. However, these instruments are, as a rule, limited to the measuring of pressures greater than one tenth of a millimeter of mercury.

The second type of gauges, using the above-mentioned principle and usually called McLeod gauges, are generally provided with two or more vessels and a number of branches and connections. The entrapment of a gas volume in a glass bulb is, conventionally, produced by the change of the level of a liquid, and this entails either flexible connections or a relative movement of a plurality of vessels. The instruments of the McLeod type are, therefore, of a less simple nature than those using the Torricelli principle. Even when adapted for industrial use they are very far from showing a simple structure.

It is the special object of the present invention to provide an instrument of the McLeod type having the simplicity of the outline and structure which distinguishes the instruments using the Torricelli principle. This is accomplished according to the invention by obtaining the entrapment of the gas, not by the movement of a liquid but by the movement of the bulb itself, which is lifted above the liquid and then returned to it. The weight of the bulb minus the weight of the displaced liquid then forms the pressure applied to the trapped gas volume.

The lifting of the bulb above the level of the liquid is performed by means of a magnetic lifting device which consists of a lifting magnet surrounding the closed vessel and of a lifting and supporting ring or annulus inside the vessel adapted to move the entrapment bulb. This magnetic device operates along the container without necessitating a seal or an interruption of the smooth surface. In the preferred embodiment of this device the lifting and supporting ring has to form part of the bulb during entrapment, as clearly the column enclosed within the ring is part of the volume entrapped, and when constructed as a separate unit not connected with the bulb, sealing means between the bulb and the lifting ring have to be provided, which are, however, of a very simple nature as the difference of pressure is small.

Where mercury can be employed the same construction may be used but in this case the lifting ring may be part of the entrapment vessel which is then constructed entirely of metal. The vessel in such a case has even to be weighted by heavy metals such as tungsten.

Further features and also further objects of the invention as well as the method of carrying the invention into effect will be apparent from the following detailed description of two modifications of the invention illustrated in the drawings. It is, however, to be understood that the invention consists in the construction, arrangement and combination of parts and members as specified in the claims but is not limited by the specific details as described. It will be clear to experts skilled in this art that most of the specific details mentioned may be changed or varied without in any way departing from the essence of the invention.

In the accompanying drawing:

Figure 1 is an elevational view partly in longitudinal section of one modification of the invention.

Figure 2 is a similar elevation almost entirely in section showing the inner member in its elevated position.

Figure 3 is an enlarged horizontal cross section through the gauge along line 3—3 of Figure 2.

Figure 4 is a partial sectional view of a further modification of the invention.

The low pressure gauge as seen from Figures 1, 2, and 3 consists essentially of a container 2, a floating gas entrapment cup or bulb 1, a lifting device 6, a sealing member 4 and a communication pipe 5 leading to the system whose gas pressure is to be measured.

The container 2, as seen in Figures 1, 2 and 3 is a smooth cylindrical vessel whose outline also forms the outline for the entire instrument which, therefore, has the simplest possible form. The only derivation from the smooth cylindrical outline is formed by the small protuberances 23 around the middle part of the container which are provided for a purpose to be mentioned later. The upper end of the container is tapered or slightly conical (at 16) to receive the conical stopper 4. At the end of the conical portion 16 a flaring portion 17 is arranged. This portion affords a trough permitting provision of a permanent or semi-permanent seal by filling it with wax, paraffin, cement or with a liquid such as mercury after the stopper 4 has been inserted.

The stopper 4 has a conical portion fitting into the conical portion 16 of the container. It is closed by a spherical or dome shaped portion from which the pipe 5 leading to the system whose vacuum has to be measured.

The stopper, forming part of the pressure transmitting system, is open at its lower end, which is serrated or provided with slots and teeth 9 around its circumference at its lower end.

It is to be understood that the stopper 4 inserted into a corresponding portion of the container is provided in all cases in which a semi-permanent sealing is desirable. If desired, a permanent seal may be substituted in which case certain auxiliary functions of the stopper may be taken over by other parts.

The container is filled with a liquid 3 which is chosen appropriately the construction, especially that of the float being affected by the nature, and especially by the specific gravity of the liquid employed.

In the modification shown in Figures 1, 2 and 3 a liquid of relatively low specific gravity is employed, one of the high boiling organic liquids such as di-butyl phthalate being preferred on account of its low vapor pressure.

The entrapment bulb on cup 1 consists of a cylindrical portion 11 of wider diameter more or less filling the container and of a thin or drawn out tube 12 which is calibrated and provided with the graduation marks 19.

To keep the entrapment float 1 whose bulbous portion 11 fills the greatest part of the cross section of the container 2 centered, a number of protuberances 14 are arranged which bridge the space which has to be left to avoid a piston-like action of the entrapment bulb when moved through the liquid. The floating entrapment bulb 1 may be adjusted to any buoyancy but it is preferred to set the buoyancy in such a way that the entrapment bulb sinks to that depth at which, when all gas is removed from its interior, the liquid inside tube 12 rises just to the top.

For such an adjustment, it is necessary, when a liquid like di-butyl phthalate of low specific gravity is used, to provide a separate buoyancy chamber 13, sealed from the remainder of the bulb and arranged as high in the float as possible.

Otherwise, the construction of the floating entrapment chamber is governed by the purpose of the arrangement and especially by the sensitivity of the instrument to be achieved. According to the above mentioned principle the weight of the float (plus adhesion forces) minus the weight of the fluid displaced equals the pressure of the entrapped gas on the cross section of the bulb and, therefore, the greatest sensitivity and precision will be possible when the change of displacement of the fluid at different depths of immersion of the tube 12 is smallest. The walls of the entrapment cup or bulb 1 should, therefore, be as thin as practicable.

Moreover, the float should have the greatest possible effective length, this being the reason for the conversion of the top of the bulb into a thin walled tube of relatively small diameter attached to a cup.

As shown in Figures 1 and 2, the bottom 15 of the container 2 may be so shaped as to penetrate into the cup and fill its interior when the latter is submerged.

The lifting arrangement comprises the magnetically permeable ring 6 and a magnet 7. The ring is arranged within the container 2 below the entrapment bulb and rests on the bottom of the container. On the end of the ring facing the entrapment bulb a groove 8 is provided into which the edge of the bulb enters. As the groove collects some fluid a seal will be formed between the entrapment bulb and the ring; the ring has to form part of the entrapment vessel when the latter is lifted above the fluid level and, therefore, a tight seal between these parts is necessary, which on account of the small differences of pressure is easily obtained by the means described.

The ring is provided with protruding ribs 10 and with cuts or recesses 10a provided between them, to facilitate gas passage and pressure equalization around the ring when the bulb is in its lifted position, while at the same time permitting a small air gap between the magnetic parts.

The lifting ring 6 of magnetic material is moved by a permanent magnet 7 which is of an annular shape closely surrounding the container. It is provided with protruding poles 7a, with grooves 7b arranged between them. The poles, as clearly seen in Figure 4, are very close to the container walls and almost touch them.

The magnet can be lifted without difficulty provided it is held in such a position that the protuberances 23 pass through the grooves or slots 7b. If the magnet is, however, rotated after having been lifted, the said protuberances will encounter the protruding pole pieces during the lowering movement of the magnet and will retain it in its raised position in which it is holding the ring 6 above the level of the fluid.

The operation of the measuring instrument explains itself.

The pipe 5 is connected with the system the pressure of which has to be measured. The floating entrapment bulb 1 and the ring 6 are in the position shown in Figure 1. The magnet 7 is now inserted from below and is lifted, entraining ring 6 and entrapment bulb 1 until both reach the position shown in Figure 2. The magnet may be turned and left in this position for a little while, resting on the protuberances. The equalization of pressure is facilitated by the slots 9 in the stopper and the grooves 10a of the ring 6 and after a short time the gas within the bulb 1 and ring 6 will have adopted the pressure of the system. The magnet 7 is now turned and removed, the ring 6 and bulb 1 go down and while the bulb remains afloat under the pressure of the entrapped air, the ring 6 may sink to the bottom.

The submersion of the bulb 1 within the fluid corresponds exactly to the gas pressure and the said pressures may be read on the scale 19.

The modification shown in Figure 4 relates to a vacuum gauge in which the fluid is mercury. On account of the high specific gravity of mercury a somewhat different construction of the floating entrapment bulb is necessary.

The bulbous portion 11 in this case has no buoyancy chamber and the ring of magnetic material may form part of the bulbous portion. Preferably the top portion 20 of the bulbous section 11 is made of magnetic material while the lower portion 21 is formed of tungsten or another heavy metal to submerse the entrapment bulb within the mercury. The magnet 7, therefore, operates directly in the upper portion of the entrapment bulb and no raising ring is necessary.

The calibrated and graduated tube 12, instead of being simply sealed is hermetically closed by a plug 22, which is as heavy as possible without making the bulb top heavy to reduce the length of the tungsten skirt 21.

In other respects the arrangement is the same as that shown in Figures 1, 2 and 3 but as the magnetically permeable lifting ring forms part of the entrapment vessel, the reading may be influenced by magnetic fields and care has to be taken that the magnet is removed and that no other disturbing fields are influencing the float.

It may finally be mentioned that a number of changes may be made, even of constructional details which are said to be of great advantage, without departing from the essence of the invention. The simple cylindrical shape and outline—equally advantageous from the standpoint of handling, of accuracy, of measurement, of easy reading and of being able to use a very simple magnetic lifting device—may be varied in certain cases, especially for the purpose of spreading the calibration over a pressure range of special interest.

Other changes consist in arranging the lifting mechanism so that the gas volume enclosed by it does no longer count, or in attaching it permanently to the glass bulb, or in embodying magnetic particles into the glass. Finally, electromagnetic means producing a magnetic field or fields moving an armature arranged within the container along the same may be employed for lifting the entrapment vessel and a number of similar changes, which will be more or less obvious to experts skilled in this art may be made without departing in any way from the novel ideas on which the present invention is based.

What I claim is:

1. A pressure gauge for measuring low gas pressures, comprising a closed and sealed, transparent container partly filled with a liquid, means for connecting the section of the container above the liquid with the gas whose pressure is to be measured, a bulbous entrapment cup floating in said liquid, and magnetic means for moving said entrapment cup within said container from its floating position into the space above the liquid so as to fill it with the gas whose pressure has to be measured and for returning it to its floating position in which the gas volume filling the bulb is entrapped.

2. A pressure gauge for measuring low gas pressures, comprising a closed and sealed, transparent container partly filled with a liquid, means for connecting the section of the container above the liquid with the gas whose pressure is to be measured, a bulbous entrapment cup floating in said liquid, magnetic means forming part of said entrapment cup and magnetic means surrounding the container and movable alongside said container for entraining the said entrapment cup, for lifting it above the liquid level, for holding it in this position and for returning it into its floating position.

3. A pressure gauge for measuring low gas pressures, comprising a closed and sealed transparent container partly filled with a liquid, means for connecting the section of the container above the liquid with the gas whose pressure is to be measured, a bulbous entrapment cup floating in said liquid, magnetically permeable means within said container engaging said entrapment cup and when moved, moving the entrapment cup along with them, and means arranged at the outside of the container surrounding the same for producing a magnetic field, acting on said magnetically permeable means within the container and movable alongside said container for entraining the said entrapment cup, for lifting it above the liquid level, for holding it in this position and for returning it into its floating position.

4. A pressure gauge for measuring low gas pressures, comprising a closed and sealed, transparent container partly filled with a liquid, means for connecting the section of the container above the liquid with the gas whose pressure is to be measured, a bulbous entrapment cup floating in said liquid, magnetic means inside said container comprising a cylindrical annulus of magnetically permeable material arranged below the said bulbous entrapment cup, said magnetic annulus forming a continuation of said bulbous entrapment cup, when engaging the latter, said cup and said annulus being provided with interengaging sealing means for preventing escape of gas between said annulus and said entrapment cup and magnetic means on the outside of the container for influencing the magnetic annulus and for lifting the combined annulus and entrapment cup above the liquid level in the container, for holding them in this position and for returning them into the liquid.

5. A pressure gauge of the class described as specified in claim 1, in which the floating entrapment cup comprises of a bulbous portion of relatively large diameter filling the container and a calibrated and graduated tube of small diameter arranged at the top of the latter, the interior of said tube communicating with said bulbous portion.

6. A pressure gauge of the class described as specified in claim 5 in which the entrapment cup is provided with a sealed buoyancy chamber arranged near the top of the bulbous portion of relatively large diameter.

7. A pressure gauge of the class described as specified in claim 1 wherein the container consists of a cylindrical vessel with a tapering portion, a hollow stopper of conical form fitting into said tapering portion and provided with tubular means adapted to be connected with the gas whose pressure has to be measured, said stopper having an end portion projecting beyond the tapering end portion of the cylindrical vessel into the same and being provided with teeth leaving gaps between them, said end portion acting as a stop for the lifted bulb through the gaps of which gas circulation and pressure equalization takes place.

8. A pressure gauge for measuring low gas pressures comprising a transparent sealed container partly filled with mercury, means for connecting the section of the container above the mercurial fluid with the gas whose pressure has to be measured, a bulbous floating entrapment cup with a bulbous portion comprising a section made of magnetically permeable material and a section made of a metal of high specific gravity, the latter section being arranged below the first named section, and a calibrated and graduated tubular section of smaller diameter arranged at the top of the bulbous section, and a magnet on the outside of the container capable of being moved along the container for entraining the magnetically permeable section of the bulbous entrapment cup within the container, in order to lift said cup from its floating position to a position above the level of liquid, to hold it in this position and to return it into its floating position.

9. A pressure gauge of the class described as specified in claim 8 wherein the floating bulbous entrapment cup is provided with a weight supported above the fluid level, when the said cup is floating.

10. A pressure gauge of the class specified in claim 4 wherein the annulus of magnetic material is provided with longitudinal channels between the parts close to the circumference and to the interior wall of the container, for permitting easy pressure equalisation between the space above and below said entrapment cup.

11. A pressure gauge for measuring low gas pressures comprising a closed and sealed transparent container, partly filled with a liquid, means for connecting the section of the container above the liquid with the gas whose pressure is to be measured, a bulbous entrapment cup floating in said liquid, and magnetically operated means for moving said entrapment cup within the closed container from its floating position to a position above the liquid level, for holding it in this position and returning it into its floating position, said magnetically operated means comprising a magnetically permeable body within the container adapted to entrain the entrapment cup, and a magnetically active means outside the container adapted to produce a magnetic field which is movable along the container for entraining the magnetically permeable body within the container.

12. A pressure gauge of the type specified in claim 3 in which the magnetically permeable means consist of a ring, arranged within the container below the entrapment cup and acting as the sole support for the same, so as to cause the entrapment cup to follow its upward and downward movement respectively.

13. A pressure gauge for measuring low gas pressures comprising a sealed transparent container partly filled with a liquid, means for connecting the section of the container above the liquid with the gas whose pressure is to be measured, said container being provided with protuberances on its outside in its upper section, a bulbous entrapment cup floating in said liquid and adapted to be lifted above the liquid, means to lift said entrapment cup comprising a magnet arrangement surrounding closely the container with portions projecting inwardly towards and into close proximity with the container and with recesses between them, adapted to perform a turning movement around the container, a magnetically permeable body within the container adapted to entrain the entrapment cup, the protuberances on the outside of the container and the recesses in the magnet surrounding the container being spaced so that in one position of the magnet the former may pass through the latter, while in another position of the magnet the protuberances engage the lower edge of the inwardly projecting portions of the magnet to hold the latter in its elevated position.

GURDON R. ABELL, Jr.

REFERENCES CITED

The following references are of record in the file of this patent:

UNITED STATES PATENTS

| Number | Name | Date |
| --- | --- | --- |
| 1,928,096 | Dubrovin | Sept. 26, 1933 |

FOREIGN PATENTS

| Number | Country | Date |
| --- | --- | --- |
| 412,409 | Germany | Apr. 18, 1925 |